US008068851B2

(12) United States Patent
Goldberg et al.

(10) Patent No.: US 8,068,851 B2
(45) Date of Patent: Nov. 29, 2011

(54) METHOD FOR PROXIMITY DETECTION IN A WIRELESS COMMUNICATION NETWORK

(75) Inventors: Keith J. Goldberg, Casselberry, FL (US); Charles R. Barker, Orlando, FL (US); Peter B. Doege, Orlando, FL (US); Guenael T. Strutt, Sanford, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 625 days.

(21) Appl. No.: 12/202,127

(22) Filed: Aug. 29, 2008

(65) Prior Publication Data
US 2010/0056174 A1   Mar. 4, 2010

(51) Int. Cl.
*H04W 24/00* (2009.01)

(52) U.S. Cl. .................. 455/456.1; 455/404.2; 455/440; 455/422.1; 455/67.11; 455/449; 370/310; 370/328

(58) Field of Classification Search ....... 455/456.1–457, 455/404.2, 440, 422.1, 41.2, 67.11, 67.4, 455/449, 524; 370/328, 310
See application file for complete search history.

(56) References Cited

U.S. PATENT DOCUMENTS

| 6,597,915 | B2 | 7/2003 | Shi et al. | |
| 6,748,324 | B2 | 6/2004 | Patwari et al. | |
| 6,768,730 | B1 | 7/2004 | Whitehill | |
| 2002/0155845 | A1* | 10/2002 | Martorana | 455/456 |
| 2002/0168943 | A1 | 11/2002 | Callaway, Jr. et al. | |
| 2005/0143101 | A1 | 6/2005 | Kyperountas et al. | |
| 2005/0221829 | A1* | 10/2005 | Nishida et al. | 455/440 |
| 2006/0176847 | A1 | 8/2006 | Chen et al. | |
| 2007/0155408 | A1 | 7/2007 | Belcea et al. | |
| 2007/0247366 | A1* | 10/2007 | Smith et al. | 342/464 |
| 2008/0014960 | A1 | 1/2008 | Chou | |

OTHER PUBLICATIONS

J. Agree, A. Akinyemi, L. Ji, R. Masuoka, P. Thakkar,"A Layered Architecture for Location-based Services in Wireless Ad Hoc Networks," IEEE Aerospace Conference Paper #387, Mar. 2002—13 pages.
X. Li, T.D. Nguyen, and R. Martin, "Using Adaptive Range Control to Maximize 1-hop Broadcast Coverage in Dense Wireless Networks," In proceedings of the 1st IEEE International Conference on Sensor and Ad Hoc Communications and Networks (SECON) Oct. 2004—p. 397-405.
N. Bulusu, V. Bychkovskiy, D. Estrin, and J. Heidemann, "Scalable, Ad Hoc Deployable, RF-Based Localization" Proceedings of the Grace Hopper Celebration of Women in Computing, Oct. 2002—5 pages.
PCT/US2009/053244—International Search Report with Written Opiniion mailed Mar. 24, 2010.

* cited by examiner

*Primary Examiner* — Nick Corsaro
*Assistant Examiner* — Chuong A Ngo
(74) *Attorney, Agent, or Firm* — Randi L. Karpinia

(57) ABSTRACT

A method for proximity detection in a wireless communication network. A node attempts to determine the proximity of the closest neighboring node by transmitting a ranging request. Other nodes respond, and the first node to receive and respond to the request will have the shortest response time and thus will be the closest node. Exact ranges can be determined by applying Time-Of-Arrival (TOA) techniques to node response times. To further avoid collisions, one or more frames of the response messages can be same, making the multiple responses appear as multi-path. The group of responders can be narrowed and individual groups probed in a search pattern until the single nearest node is known or range of the nearest node is known. The ranging node may then use ordinary unicast mechanisms to probe this node, or begin scanning the groups again, or interleave the two mechanisms as desired.

16 Claims, 9 Drawing Sheets

METHOD FOR PROXIMITY DETECTION IN A WIRELESS COMMUNICATION NETWORK

FIELD OF THE DISCLOSURE

The present disclosure relates generally to wireless communication networks and more particularly to proximity detection methods in a wireless communication network.

BACKGROUND

There are various scenarios in which proximity detection can be essential to an operation. For example, in an open pit mine, large equipment and numerous workers coexist at close quarters, posing a constant danger that a machine operator, who often has limited visibility, may not be able to see persons close to the machine, with possibly serious consequences. Similar situations can be found wherever large equipment is operated.

One method for addressing proximity detection requirements is to attach wireless communication devices communicating within a wireless communication network to all objects or persons within an area. Time-Of-Arrival (TOA) techniques can then used, for example, for proximity detection, by computing distances between the wireless communication devices to determine their absolute or relative locations.

However, wireless network congestion limits the scalability of various existing proximity detection techniques. Accordingly, there is a need for a scalable, flexible method for performing proximity detection in a wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
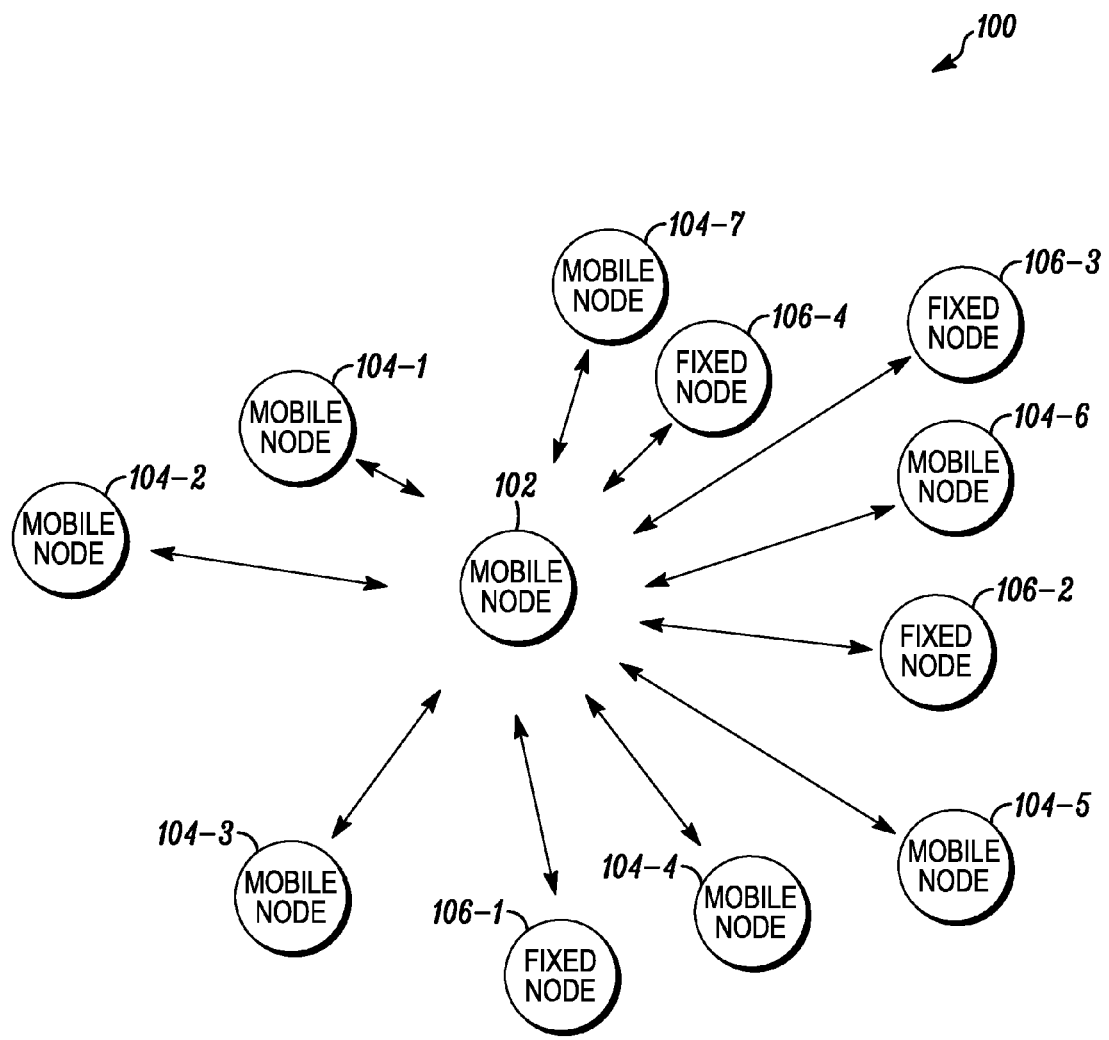
FIG. 1 is a block diagram of an example wireless communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, the following discussion sets out a number of embodiments of a method for proximity detection in a wireless communication network. In general, these embodiments begin with a ranging node transmitting a first ranging request to a group of target nodes. Next, the ranging node receives responses to the first ranging request, from one or more target nodes, each response including one or more identical response frames. Thereafter, a proximity range of one or more target nodes closest to the ranging node is determined, by identifying the signal having the earliest time of arrival at the ranging node. Note that the term "proximity range" is employed in this disclosure to denote the distance between the ranging node and the closest target node in the network.

FIG. 1 is a block diagram of an example wireless communication network 100 for implementing various embodiments of the claimed invention. The wireless communication network 100 can be implemented using any of the various technology solutions available to those in the art, applicable to networks requiring reliable wireless, broadband communications, such as a wireless Local Area Network (LAN), wireless Metropolitan Area Network (MAN), or Mobile devices networks, such as Global System for Mobile Communications (GSM), Personal Communications Service (PCS) and Digital Advanced Mobile Phone Service (D-AMPS)). Additionally, it is anticipated that technological development will bring other solutions into use in the future, and that those solutions may be deployed in connection with the claimed invention, which is not limited in any way by the network technology.

The wireless communication network 100 includes a number of wireless nodes 102, 104-1 to 104-7 and 106-1 to 106-4, configured for mutual communication. It will be appreciated by those of ordinary skill in the art that any number and combination of nodes can be implemented in accordance with the various embodiments of the present invention. Some nodes, such as wireless nodes 104-1 to 104-7, are mobile wireless nodes, and others, such as wireless nodes 106-1 to 106-4, are fixed wireless nodes. Thus, the diagram represents a network as might be found at a worksite or operational area, where mobile nodes are portable or mobile radio units, carried by individuals or mounted in vehicles, and fixed nodes are non-mobile devices in headquarters buildings or trailers, for example. As will be appreciated upon considering the following material, wireless nodes perform a number of computational functions in the various embodiments described, and it will thus be preferred to employ digital equipment, such as the Mesh Enabled Architecture mobile broadband radios produced and sold by Motorola, Inc. under the trademark MOTOMESH.

In typical worksite situations, it is often important for the operator of a piece of heavy equipment to know where other personnel are located before moving the equipment. The method presented herein addresses that requirement, employing the capabilities of the various wireless nodes to provide raw information, from which position information can be calculated.

The following discussion addresses a situation in which the operator of wireless node 102 needs to determine the location of nearby personnel and vehicles before moving a piece of equipment, for example. The task can be stated as determining the proximity range between a ranging node (here, wireless node 102) and nearby target nodes (wireless nodes 104-1 to 104-7 and 106-1 to 106-4). For that purpose, the network 100 can be best described as shown in FIG. 1, as a ranging node in the center, and target nodes clustered around that node, with a communication path, indicated by two-way arrows, between each target node and the ranging node. In broad terms, and as is discussed in more detail below, the wireless node 102 transmits a ranging signal, and upon receiving that signal each target node transmits a response.

It should be noted that each wireless node in the network can serve as either or both a ranging node and a target node, based on situational needs that arise during a workday. Thus, it will be appreciated that the arrangement of nodes shown in FIG. 1 and subsequent iterations are examples of how the method of the claimed invention would function in a particular situation. In the discussion that follows, the terms "wireless node 102" will be considered interchangeable with "ranging node 102", and the term "target nodes" will refer generally to wireless nodes 104-1 to 104-7 and 106-1 to 106-4.

Figure 2:
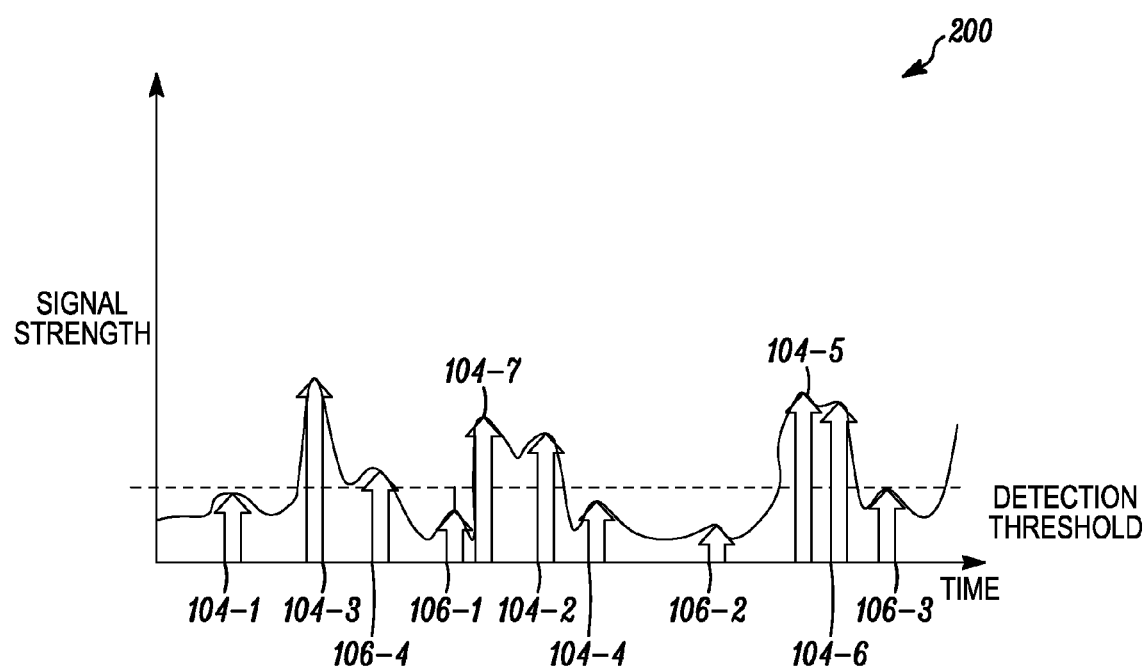
FIG. 2 is a graph showing signal strength versus time for responses sent by target nodes in a wireless communication network in accordance with some embodiments.

FIG. 2 charts signal strength versus time for responses sent by target nodes and received at the ranging node 102. Each arrow is labeled to indicate the node from which the signal was sent. As seen, in this example, the receiver at the ranging node 102 may not be able to synchronize properly because too many signals reach the receiver within a short span of time. An Automatic Gain Controller (AGC) of the receiver in the ranging node 102 may reduce the input signal in such a way that the correlated signal does not reach a level sufficient to trigger the synchronization process, as shown by the dotted line in FIG. 2. Thus, signals sent by the wireless nodes 104-1, 104-4, 106-1, 106-2 and 106-3 do not register as having been received at ranging node 102.

Figure 3:
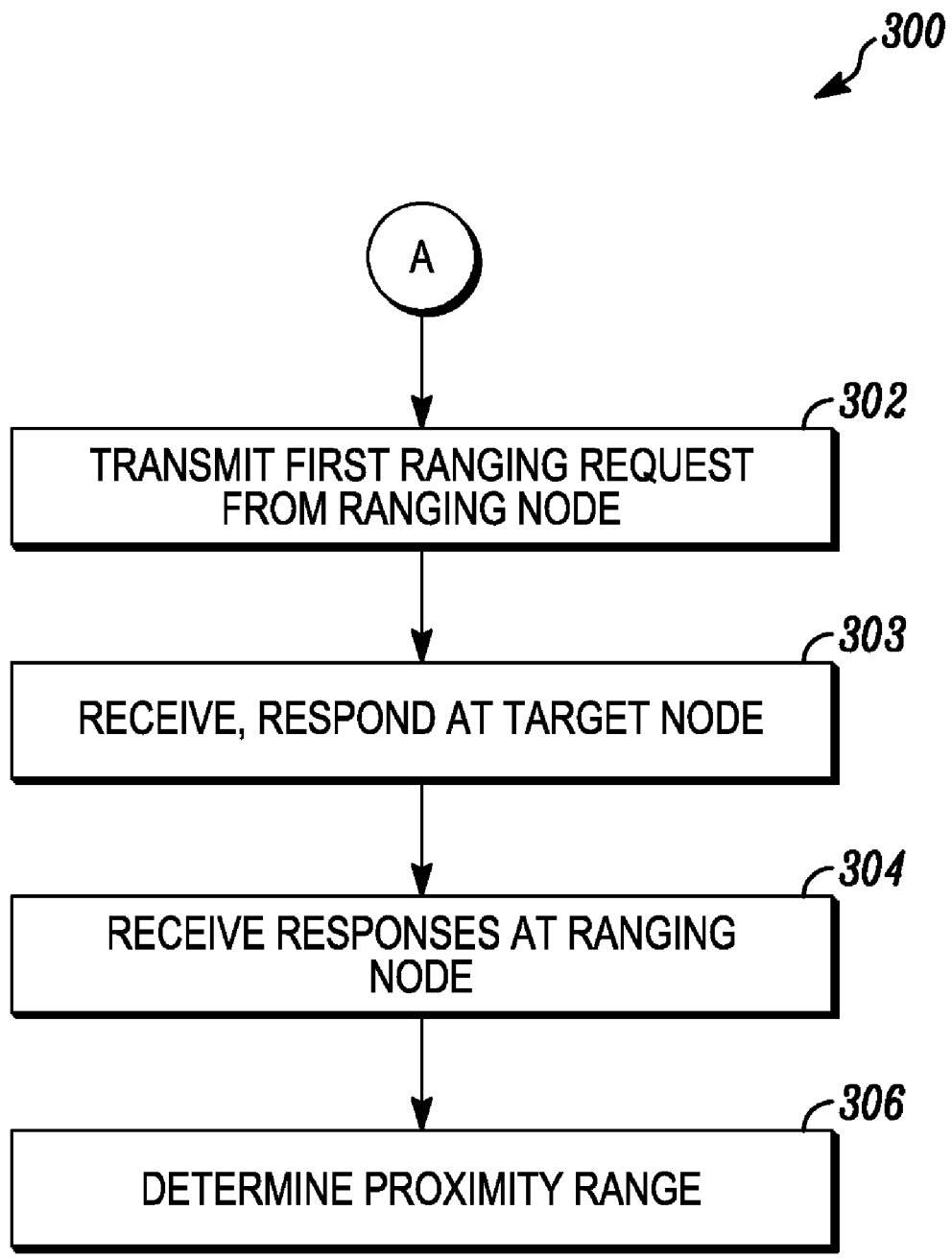
FIG. 3 is a flowchart of a method for proximity detection in a wireless communication network in accordance with some embodiments.

The result of the ranging signal can be illustrated as a set of six received signals, spaced in time from the time at which the signal from the wireless node 104-3 is received to the time at which the signal from wireless node 104-6 is received. As illustrated in FIG. 2, five signals were not received with sufficient signal strength to meet the receiver detection threshold, (i.e. the signals from wireless nodes 104-1, 106-1, 104-4, 106-2, and 106-3). One resulting issue, as illustrated, is that the signal from wireless node 104-1, the node located closes to the ranging node 102 was not received with sufficient signal strength to meet the receiver detection threshold FIG. 3 is a flowchart 300 illustrating an embodiment of a method for proximity detection in the wireless communication network 100. This method can be implemented within each wireless node in network 100, either by software, firmware, or a combination of the two. The functionality shown here can be initiated by any conventional, convenient means known to those in the art. For example, the process could be conveniently triggered by a button on a portable or mobile radio control panel, or by a set of keystrokes. It is desirable that the initiation means be easy and fast to use, allowing an operator to conduct a proximity detection quickly and reliably.

The process 300 of FIG. 3 begins when the ranging node 102 transmits a first ranging request to a group of target nodes, at operation 302. The details of operation 302 are further discussed hereinafter in connection with FIG. 5 and FIG. 6 below.

The first ranging request can be generally directed at all target nodes, or it can be selectively directed to some subset of target nodes. It will be appreciated by those skilled in the art that restricting the target nodes to the smallest group consistent with reliable proximity identification would be advantageous, both from a view of optimizing processing time to one of ensuring that all desired target nodes are accounted for before taking action, such as moving a piece of equipment. Thus, it could be desirable to limit the ranging request to mobile nodes only, if it were known that fixed nodes were not in a position to pose a danger. Alternatively, a network could include a number of workgroups, but only the members of the same workgroup as the ranging node would be in a position of potential danger, allowing the signal to be restricted by workgroup. In any of these instances, the outgoing signal can be addressed in a conventional manner to reach only the desired subset of target nodes. Techniques to achieve that result include employing a base address and bitmask, or setting the upper/lower bounds of an address range. The ranging node 102 transmits the first ranging request periodically after waiting for a pre-defined threshold time.

In another alternate embodiment, the ranging node 102 groupcasts or multi-casts the first ranging request, rather than broadcasting. Either of those techniques allows identification of which target nodes are required to respond. The identification can be any identifier used in the particular system to signify a given node, such as an Internet Protocol (IP) address, a Media Access Control (MAC) address, or any other unique or reasonably-unique identification employed in the system. As with using addressing schemes, identifying specific nodes allows the ranging node 102 to concentrate the proximity range process on a limited number of nodes.

The decision of whether to broadcast the first ranging request depends on several factors. First, it will be appreciated by those of ordinary skill in the art that the broadcast mode carries a number of advantages. Primarily, broadcasting covers the entire network with a single ranging request. When the desired result is clearance to move a piece of equipment, the broadcast mode allows a simultaneous query of all network nodes, providing positive clearance from all users. That method precludes the situation in which a visitor to a workgroup area might not be addressed by the ranging request.

Conversely, several performance criteria indicate whether broadcasting provides sufficient reliability. The first criteria is whether the ranging node 102 is able to receive sufficient correlated energy to register a signal as received, from every network node, or at least every node close enough to pose a problem. The next criteria is whether the received signal will be sufficiently intelligible to allow the ranging node 102 to reasonably determine that the received signal was intended as a response to the first ranging request. Another criteria is whether the ranging node 102 is required to know only an approximate range to the nearest node, without knowing the address of that node. It will be appreciated that other performance criteria can be considered in determining whether or not to broadcast the ranging request.

The determinations of each of the previously discussed criteria can, in one embodiment, be considered in advance for particular worksites, or by policy. Alternatively, it will be appreciated by those of ordinary skill in the art that various automated procedures can be implemented for determining whether broadcast techniques will provide sufficient reliability. For example a test regime that periodically tests reception among network nodes, can be implemented. Both the broadcasting and other options will be described hereinafter.

Returning to FIG. 3, step 303, target nodes receive the first ranging request and respond to it with an acknowledgement message. For example, the target nodes can automatically send a prearranged reply message back to the ranging node 102. In one embodiment, target nodes respond within a predetermined time period after the first ranging request is received.

Alternatively, some embodiments can take advantage of the fact that closer target nodes will respond sooner than distant nodes; the latter can listen for responses sent by the closer nodes, and upon hearing them, abort their own transmissions. In that way, network traffic is minimized by eliminating transmissions that are completely redundant, given the need to identify the closest nodes, not those further away. Applying such a process to the distribution of nodes in FIG. 1, for example, wireless nodes 106-3, 104-6, 106-2 and 104-5 are located at a considerable distance from ranging node 102, and their responses arrive considerably later than signals from closer nodes. Those distant nodes could have listened for signals such as that from wireless node 104-3 and aborted their own responses. Such a system would allow the ranging node to process earlier signals faster, as well as eliminate clutter from excess transmissions.

Thereafter, at step 304, the ranging node 102 receives the responses from the target nodes. The near-simultaneous arrival of a large number of response signals can lead to a complete message jam at the ranging node 102, resulting in none of the responses being intelligibly received. This problem is solved in the following manner. First, each response includes identical response frames. If the messages were all different, the receiver would not be able to distinguish any one response from another. Receiving the same content from a number of sources, however, looks to the receiver exactly like a single message being received in a multi-path environment, where a single signal is reflected or propagated via a number of paths, each component arriving at the receiver slightly out of phase with the other components. As is known in the art, the receiver of the ranging node 102 can be, and normally is, equipped with means for coping with multi-path reception, ensuring that only the strongest signal is fully received. In a true multi-path environment that signal would be the direct-path component, and here that signal originates from the target node closest to the ranging node.

The ranging node 102 expects to receive responses within a pre-defined threshold time. If no response is received during that time, the system optionally provides an indication to the user, showing that the device is functioning properly, but no target node signal was received, possibly because no target was in the transmission range of the ranging node 102. This indication can be chosen from any of the many forms available, based on system requirements, and it can take the form of an audio, visual or tactile indication.

Having received signals, the system determines the proximity ranges of target nodes closest to the ranging node 102, in step 306. The ranging node 102 records time information, of both the transmission and receipt of messages, and it uses that information to determine the proximity range, employing conventional Time of Arrival (TOA) techniques. The calculations for Time of Arrival can be implemented, by software, firmware or some combination of those.

In the situation in which collisions occur among the responses, the ranging node 102 will still have received time information for reception of the responses, and that information can be used to determine the proximity range. This can be useful in some applications, where it is desirable to determine whether any node is within a specified distance of the ranging node. For example, when the desired information is whether a responding node is within a stated range of the ranging node, receiving the detailed information content of a response message may not be required.

In another embodiment, a pre-defined geographical range is provided, which is an unsafe region. This range could specify, for example, a minimum safe distance separating any node from the ranging node, which could be located on a piece of equipment. The presence of any node, indicating the presence of a person or an object, within that proximity range could trigger an indication, as noted above, or it could automatically initiate actions such sounding an alarm or activating an interlock that prevents the equipment's movement.

In any of these scenarios, the method provides a proximity range as output, even if that output is an indication that the proximity range is either "safe" or "unsafe."

It will be appreciated by to those of ordinary skill in the art that two or more nodes may lie at exactly the same distance from the ranging node. Whereas the discussion above speaks in terms of finding a single node, for purposes of simplicity, the method of the claim invention provides for adding the capability of identifying possible multiple nodes responding to the stated conditions.

One of the embodiments discussed above was aimed at simply determining the range of the closest node, regardless of the identification of that node. In other circumstances, it may be important to determine that identification, and the following embodiment sets out a process for accomplishing that result. One can determine a node identification from that node's signal, of course, but as explained above, the close proximity of the network elements, relatively speaking, results in signal collisions if a call for response is simply broadcast. The present embodiment sets out a method for rapidly searching the network for the identity of a node with given characteristics, namely the closest distance to the ranging node.

Figure 4:
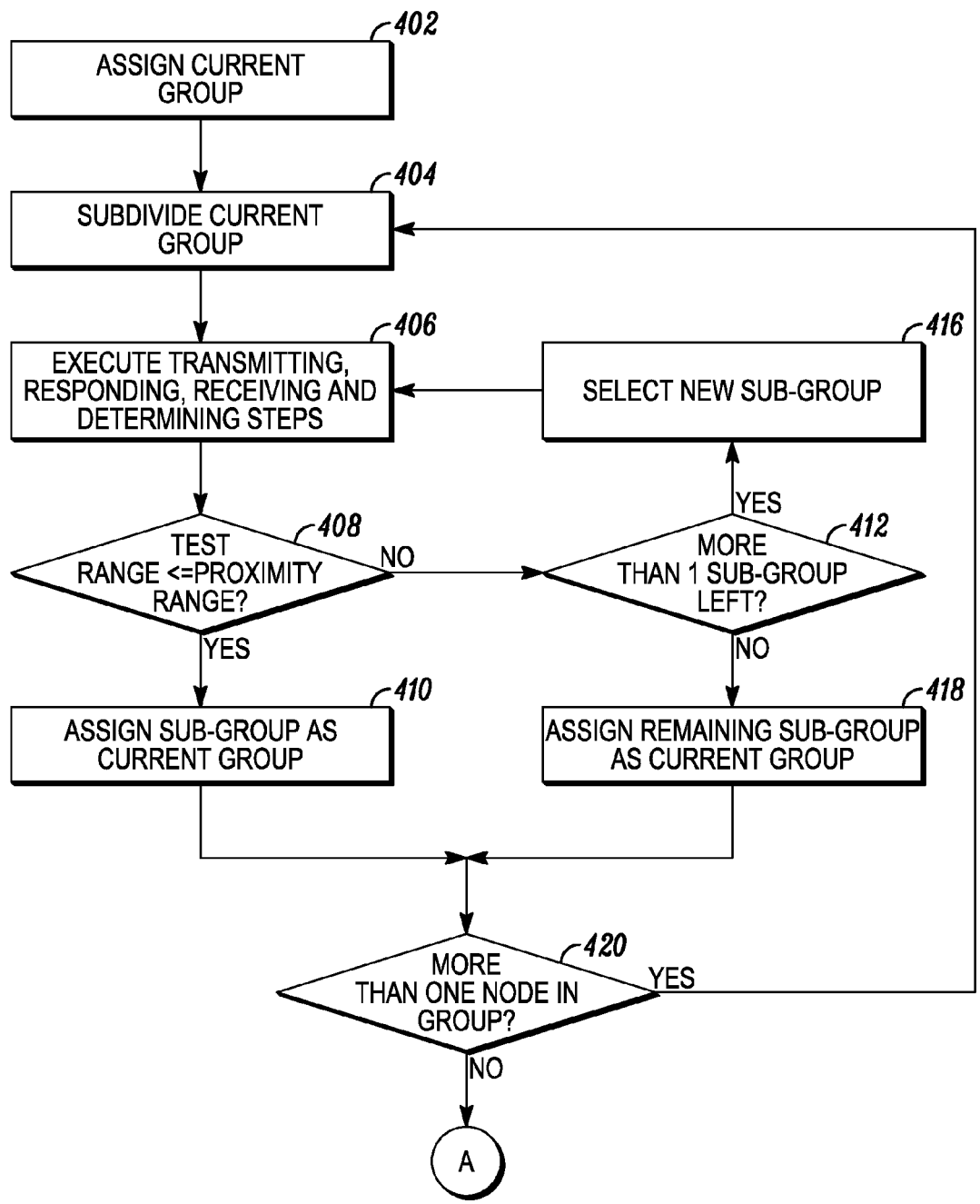
FIG. 4 is a flowchart of a method for grouping wireless nodes in a wireless communication network for proximity detection in accordance with some embodiments.

FIG. 4 is a flowchart 400 illustrating an embodiment of a method for searching the set of wireless nodes in the wireless communication network 100 to identify the node closest to the ranging node. It should be noted that this embodiment presumes that the system has already executed the process described hereinbefore for determining the proximity range. Thus, the task can be restated as identifying the node whose range from the ranging node corresponds to the proximity range.

It should be further noted that the process embodiments set out hereinbefore may not determine the true proximity range. As was the case in FIG. 2, the signal from the closest target node may not be received by the ranging node. Therefore, the task should be restated as identifying the node whose range from the ranging node is actually the shortest distance.

Generally, the embodiment of FIG. 4 executes a search of the entire set of target nodes. That search could be conducted by polling, however the polling process could take too much time to provide results in a desired manner. At each step in the search, the method handles a current group of nodes. The current group begins with the entire set in one embodiment, and in all embodiments the current group is reduced by various steps. The current group is divided into sub-groups, and one sub-group is sent a ranging request, allowing the system to compute a sub-group proximity range, called the test range. Each sub-group except the last is tested in that manner, allowing the method to determine which sub-group contains the node whose test range is equal to or less than the proximity range. Then, that sub-group is designated as the new current group, and the search iterates through the steps set out above, continuing until the current group contains only a single node, which will be the node closest to the ranging node. The details of this process, in a generic embodiment and an embodiment implementing a binary search, are set out below.

The process of FIG. 4 begins with step 402, where the entire group of target nodes is assigned as a current group. Thereafter, the current group is sub-divided into two or more sub-groups (step 404), either randomly or according to a predetermined method. One scheme calls for sub-dividing the current group into even groups, and then performing a binary search to find the closest node to the ranging node 102. That method is explained in detail in connection with FIGS. 7-9 below. Returning to the general example of FIG. 4, the current group and the two or more sub-groups may be specified by any convenient identifier known in the art, such as a base address or bitmask. Alternately, the upper/lower bounds of an address range can be specified.

Here, the process needs to determine the closest node from among the nodes assigned to the sub-group, and to accomplish that result, step 406 executes the transmitting, receiving and determining steps (i.e., steps 302, 303, 304, and 306 of FIG. 3) are executed on the nodes assigned to the sub-group. The transmitting step here includes transmitting a second ranging request to the sub-group nodes; receiving and responding to that request at the sub-group nodes; receiving responses from the sub-group nodes; and determining the minimum range by TOA techniques, as described previously. The minimum range is referred to as a test range, differentiating it from the proximity range determined for the network as a whole.

Decision step 408 asks whether the test range is less than or equal to the proximity range, which indicates that the closest node is either in the selected sub-group (if the answer is Yes) or is not in that sub-group (if the answer is No). A Yes answer carries the process to step 410, where the sub-group is assigned as the new current group. A No answer indicates that more analysis is required, and the process next determines whether more than a single sub-group remains, at decision block 412. A Yes answer indicates that the closest node mode lie in the nodes assigned to the remaining sub-group, so that sub-group is assigned as the new current group, at step 418. Conversely, a No response indicates that the closest node can lie in one of at least two sub-groups, so a new sub-group is selected for analysis at step 416, and the process loops back to the executing step 406.

If more than two sub-groups were originally created, steps 406-418 are iterated until either the test range is less than or equal to the proximity range (step 408) or only one sub-group remains (step 408). Either of those results leads to the assignment of a new current group (steps 410, 418), after which step 420 checks whether the current group contains more than one target node. If it does, indicating that the closest node has not been identified, the process loops back to step 404. If the current group contains only one target node, then that node is the closest to the ranging node, and the process returns to step 302 of FIG. 3. If the current group is vacant, the process is aborted.

The embodiment of FIG. 4 is particularly useful when the ranging node 102 is required to know the address of the closest node. It is also helpful under conditions when the criteria set out for the embodiment of FIG. 3 are not met. That situation occurs when the ranging node 102 is unable to receive sufficient input correlated energy from all nodes, or the ranging node 102 is unable to determine whether the received responses were intended for it. In an alternate embodiment, if the identity of the closest node is not required, but the system is unable to determine a proximity range using the embodiment discussed in connection with FIG. 3, the system can execute the steps discussed in connection with FIG. 4 until a point at which the input correlated energy is sufficient to determine a range. That process produces a provisional proximity range that can be useful. Still further, when the ranging node 102 determines the address of the closest node, it may use unicast ranging to the closest node for more frequent updates and interleaving with other group requests.

It will be recalled that the method set out in FIG. 3 entails the possibility that the signal selected for calculating the proximity range may not actually originate from the closest target node. As was seen in FIG. 2, the signal at arrow 104-1 originates from the closest node, yet that signal will not be processed because the signal strength lies below the detection threshold. Instead, the wireless node 104-3 will be designated the closest node, and the range to that node will be calculated as the proximity range. Where this possibility is sufficiently strong to indicate a problem, the method set out in connection with FIG. 4 provides a higher probability of finding the closest node in spite of it being overpowered. This point is explained in greater detail in connection with FIG. 5 below.

Figure 5:
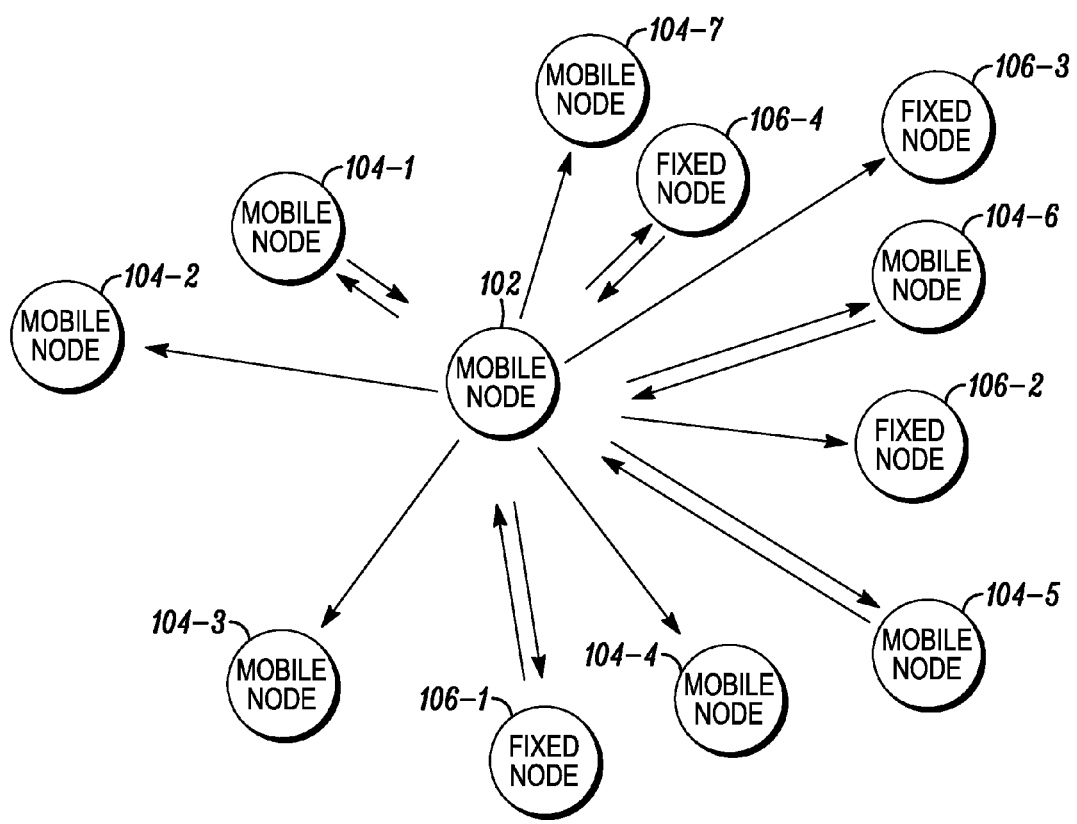
FIG. 5 is a block diagram of a wireless communication network in accordance with some embodiments.
Figure 6:
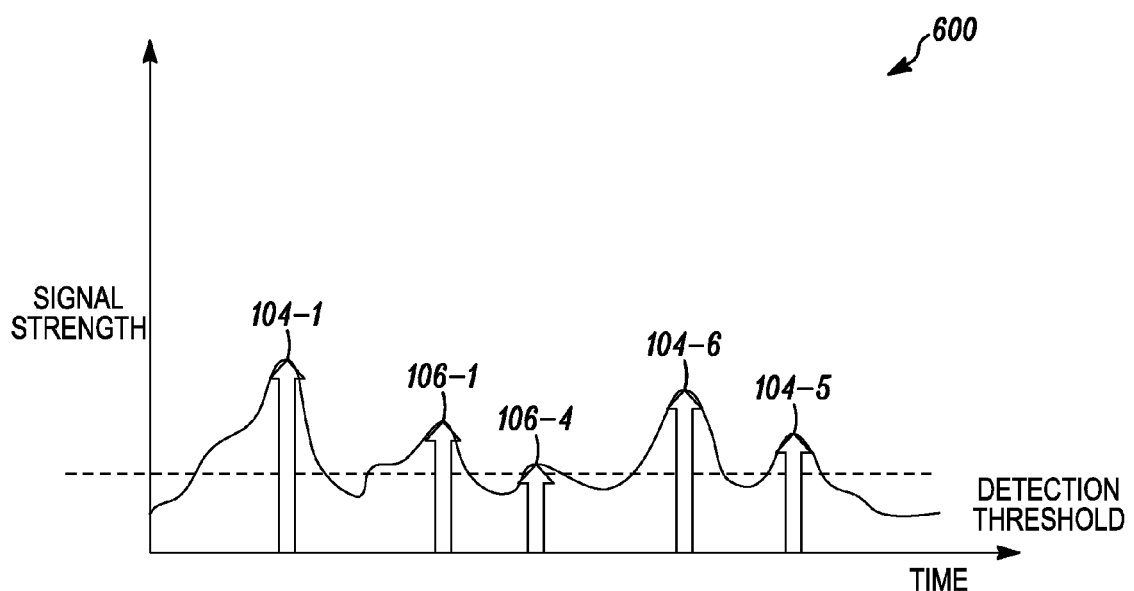
FIG. 6 is a graph showing signal strength versus time for responses sent by target nodes in the wireless communication network

FIGS. 5 and 6 show an embodiment of a method for increasing the reliability of the results achieved by the embodiment of FIG. 3. FIG. 5 illustrates a diagram of the wireless communication network 100, showing communication arrows between ranging node 102 and target nodes. Instead of addressing the entire group of target nodes, however, the first ranging request in FIG. 5 identifies a subset of target nodes, including nodes 104-1, 104-5, 104-6, 106-1 and 106-4. As described above, the node identification can take the form of addressing limitations or specific identification of nodes required to respond.

FIG. 6 includes graph 600, charting signal strength versus time for responses sent by the target nodes described in FIG. 5 above. The signal-strength of the responses is shown in the graph 600, with arrows labeled to indicate the sending node. Here, however, the smaller number of responding nodes allows the receiver of ranging node 102 to boost its AGC, increasing the correlated signal processed by the receiver. That boost increases the received signal level from wireless node 104-1 to the point where that signal is received, and thus the TOA for that signal produces the proximity range. Thus, by reducing the number of sampled nodes, the method increases the probability of correctly identifying the closest node.

Furthermore, in an alternate embodiment, addressing specific nodes allows the embodiment to ensure that every node is accounted for. If a given node does not respond, the receiver sensitivity can be automatically adjusted to increase the probability of receiving that signal, thus enabling the system to positively identify each node and the real proximity distance.

Figure 7:
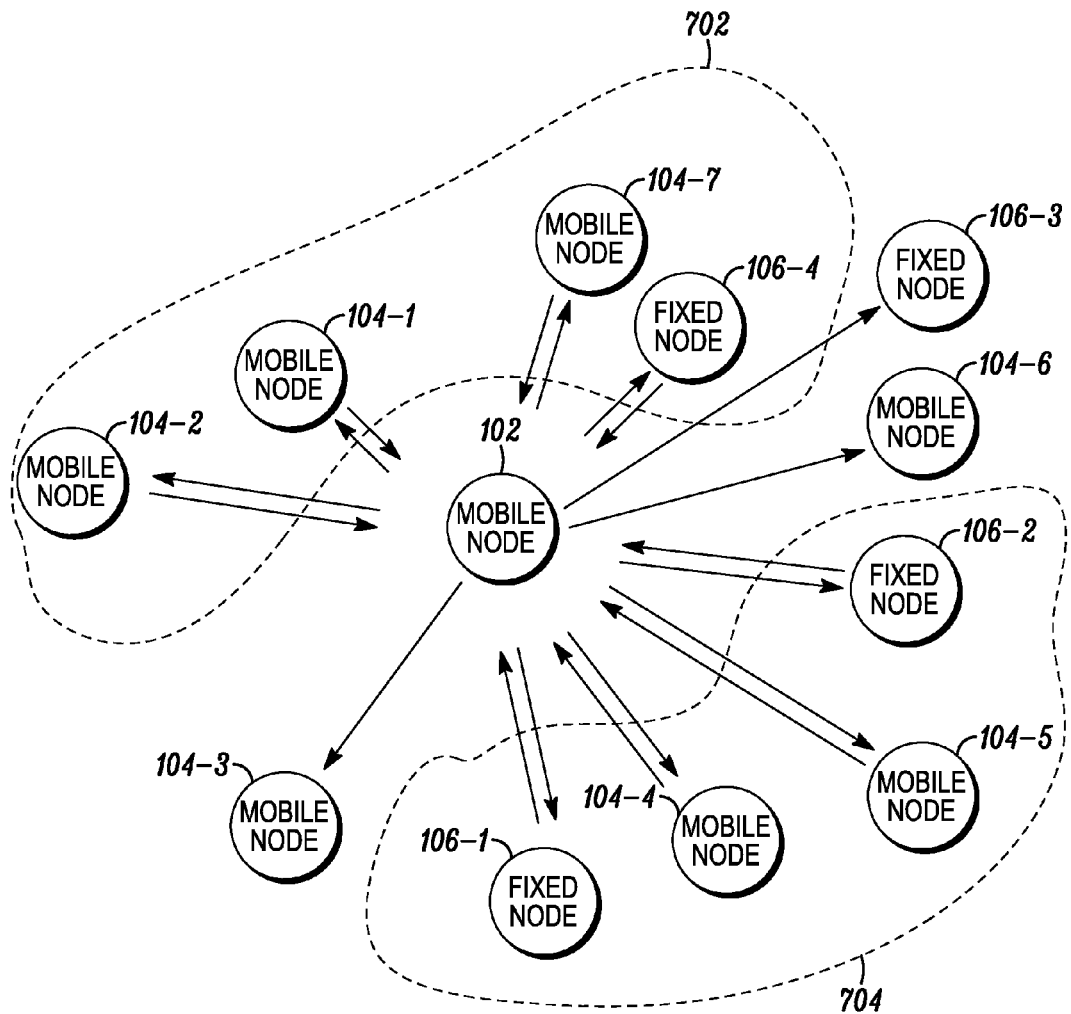
FIG. 7 is a block diagram illustrating grouping of wireless nodes in a wireless communication network for proximity detection in accordance with some embodiments.
Figure 8:
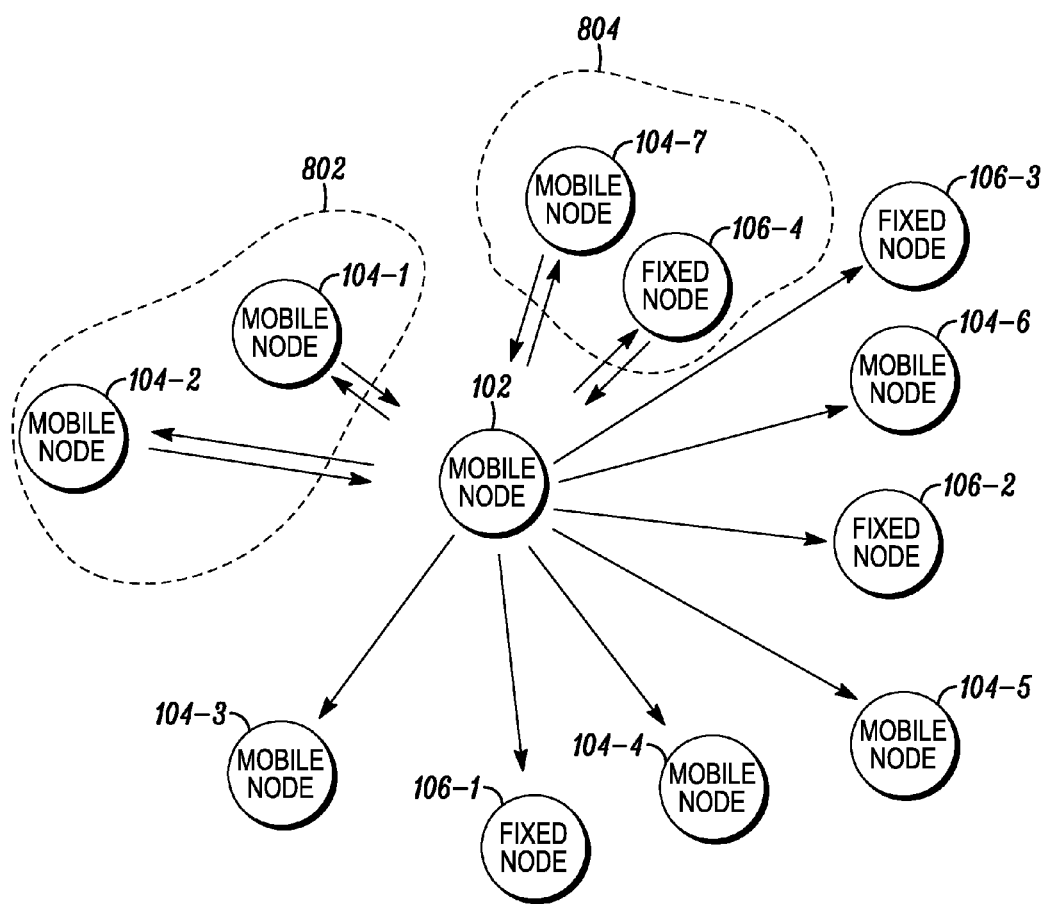
FIG. 8 is a block diagram illustrating grouping of wireless nodes in a wireless communication network for proximity detection in accordance with some embodiments.
Figure 9:
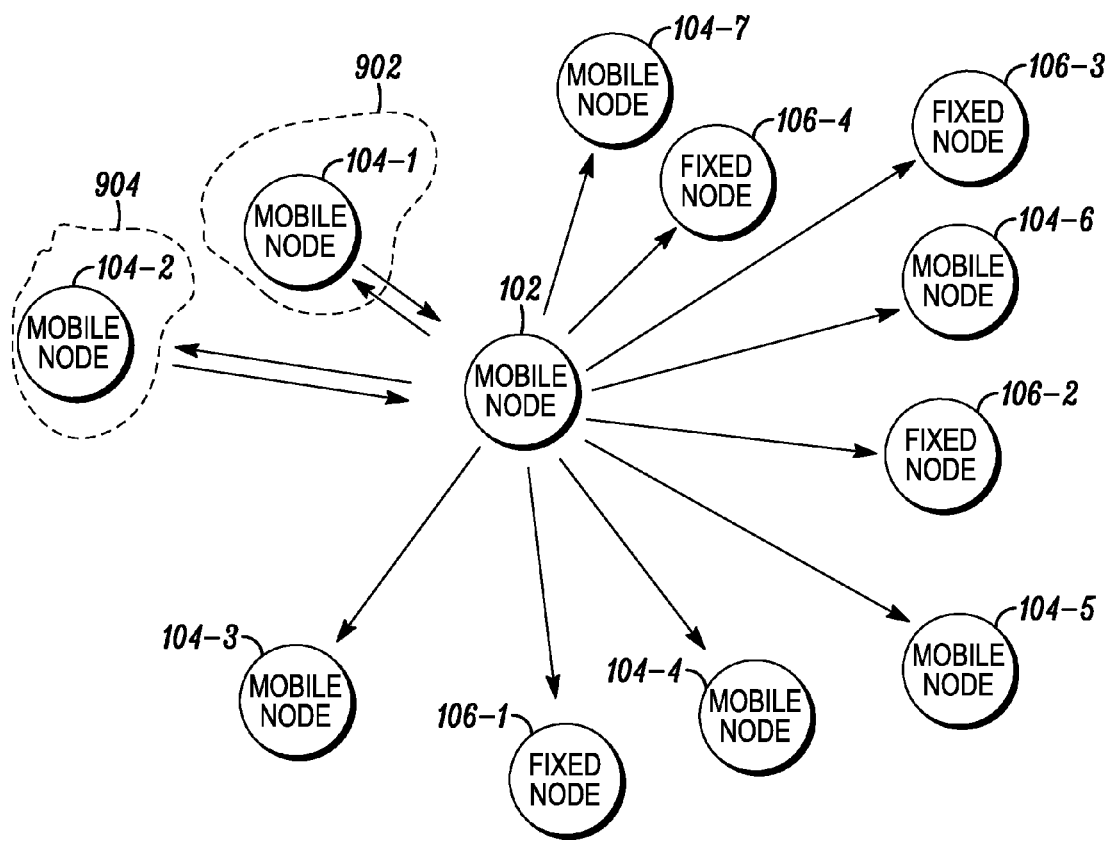
FIG. 9 is a block diagram illustrating grouping of wireless nodes in a wireless communication network for proximity detection in accordance with some embodiments.

FIGS. 7, 8 and 9 illustrate the process of carrying out the group sub-division process discussed in connection with FIG. 4, carried out as a binary search. Here, FIG. 7 illustrates a grouping of wireless nodes in the wireless communication network 100 for proximity detection, where the ranging node 102 transmits a first ranging request to the entire group of target nodes, as noted by the outgoing arrows. The first ranging request may include identification of the target nodes that are required to send response to the first ranging request. The ranging node 102 receives responses from the wireless nodes 104-1, 104-2, 104-4, 104-5, 104-7, 106-1, 106-2 and 106-4, as noted by the return arrows. As can be seen, the wireless nodes 104-3, 104-6 and 106-3 do not respond, as either the first ranging request does not include the identification for these nodes or they did not receive the ranging request, or their response did not meet or exceed the detection threshold at the ranging node 102. The received responses include one or more identical response frames, using the techniques discussed above, a proximity range of one or more target nodes closest to the ranging node 102 is determined. Here, the wireless node 104-1 has the earliest TOA of the received responses at the ranging node 102, and the range to that node is selected as the proximity range.

Next, the responding target nodes are assigned as the current group, which group is in turn sub-divided into two sub-groups 702 and 704. The sub-group 702 includes the wireless nodes 104-1, 104-2, 104-7 and 106-4, and the sub-group 704 includes the wireless nodes 104-4, 104-5, 106-1 and 106-2. Here, a total of eight nodes responded, and the sub-groups were selected to contain four nodes apiece. It should be noted that the sub-groups 702 and 704 are shown as being physically separated, but that depiction is done for purposes of illustration. The specific nodes selected for each group can be selected in accordance with any desired scheme, the key factor being the number of nodes in each group.

The transmitting, receiving and determining steps are executed on the sub-group 702, as explained in detail in connection with FIG. 3 above. Here, that operation includes transmitting a second ranging request to the sub-group 702, and then identifying a test range, indicating the closest distance between any target node in the sub-group 702 and the ranging node 102. Here, the wireless node 104-1 is closest to the ranging node 102, so the test range corresponds to the range of the wireless node 104-1. Then, the test range is compared with the proximity range, to determine whether the node closest to the ranging node 102 lies in the sub-group 702 (which would be true if the test range were equal to or less than the proximity range), or in the sub-group 704 (which would be true if the test range were greater than the proximity range). In the case where no responses are received to the second ranging request by the ranging node 102, the sub-group 704 is selected and the executing, comparing and performing steps are repeated on the sub-group 704.

FIG. 8 illustrates the next iteration of the process started in FIG. 7. That operation revealed that the closest node was contained in the sub-group 702, and the process is carried forward by designating the sub-group 702 as the new current group, which in turn is sub-divided into sub-groups 802 and 804. The sub-group 802 includes the wireless nodes 104-1 and 104-2 and the sub-group 804 includes the wireless nodes 104-7 and 106-4. The transmitting, receiving and determining steps are executed on the sub-group 802, as set out in connection with FIG. 7, and the resulting test range is compared to the proximity range to determine whether the closest node is contained in the sub-group 802 or 804. Again, if no responses are received to the second ranging request by the ranging node 102, the sub-group 804 is selected and the executing, comparing and performing steps are repeated on the sub-group 804. The closest node remains the wireless node 104-1, and thus the closest node is determined to lie in the sub-group 802.

FIG. 9 illustrates the next iteration of the process started in FIGS. 7 and 8. The sub-group 802 is selected as the new current group, which is then sub-divided into sub-groups 902 and 904. The sub-group 902 includes the wireless node 104-1. The sub-group 904 includes the wireless node 104-2. The transmitting, receiving and determining steps are executed on the sub-group 902, as set out in connection with FIG. 7, and the resulting test range is compared to the proximity range to determine whether the closest node is contained in the sub-group 902 or 904. Again, if no responses are received to the second ranging request by the ranging node 102, the sub-group 904 is selected and the executing, comparing and performing steps are repeated on that sub-group. The closest node remains the wireless node 104-1, and thus the closest node is determined to lie in the sub-group 902.

The current group (the sub-group 902) includes a single wireless node, the wireless node 104-1. The wireless node 104-1 is determined to lie closest to the ranging node 102.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for proximity detection in a wireless communication network, the method comprising:
    assigning, by a ranging node, a current group comprising a plurality of target nodes;
    sub-dividing, by the ranging node, the current group into two or more sub-groups;
    transmitting a first ranging request from the ranging node to a first plurality of target nodes within a first sub-group;
    receiving responses to the first ranging request, from one or more of the first plurality of target nodes, at the ranging node, wherein the received responses comprise at least one identical response frame; and
    determining a proximity range of at least one target node closest to the ranging node, wherein response from a target node has an earliest time of arrival of the received responses at the ranging node.

2. The method of claim 1, further comprising receiving the first ranging request and sending the responses, at the one or more target nodes.

3. The method of claim 2, wherein the one or more target nodes send the responses after a pre-determined duration of time, after the first ranging request is received.

4. The method of claim 1, further comprising at least some of the first plurality of target nodes operating to:
    detect a response sent by a target node closest to the ranging node; and
    abort transmission of responses by the at least some of the first plurality of target nodes.

5. The method of claim 1, wherein the transmitting step includes broadcasting the first ranging request from the ranging node.

6. The method of claim 1, wherein the receiving includes receiving the responses from the one or more of the first plurality of target nodes as a single response, combining the signals from one or more identical response frames.

7. The method of claim 1, wherein the receiving step includes receiving the responses within a pre-defined threshold time.

8. The method of claim 7, wherein the transmitting step further includes transmitting the first ranging request periodically after waiting for the pre-defined threshold time.

9. The method of claim 7 further includes providing an indication upon determining that the responses to the first ranging request are not received at the ranging node within the pre-defined threshold time.

10. The method of claim 1, further comprising providing an indication when the proximity range is less than a pre-defined range.

11. The method of claim 10, the indication comprises at least one of an audio, a visual and a haptic indication.

12. The method of claim 1, wherein the first ranging request includes an identification of the first plurality of target nodes.

13. The method of claim 12, wherein the identification comprises at least one of an Internet Protocol (IP) address and a Media Access Control (MAC) address.

14. The method of claim 1, further comprising: transmitting a second ranging request to a further sub-group of the first sub-group, thereby identifying a test range of one or more target nodes in the first sub-group being closest to the ranging node;
    comparing the test range to the proximity range; and
    performing one of:
        assigning the further sub-group as the current group, upon determining that the test range is equal to or less than the proximity range; and
        selecting another sub-group and repeating the executing, comparing and performing steps, upon determining that the test range is greater than the proximity range.

15. The method of claim 14, further comprising,
    repeating the sub-dividing step, until the current group contains at most one target node.

16. The method of claim 14, further comprising,
    selecting another sub-group and repeating the executing, comparing and performing steps, when no responses to the second ranging request are received by the ranging node.

* * * * *

UNITED STATES PATENT AND TRADEMARK OFFICE
CERTIFICATE OF CORRECTION

PATENT NO. : 8,068,851 B2  Page 1 of 1
APPLICATION NO. : 12/202127
DATED : November 29, 2011
INVENTOR(S) : Goldberg et al.

It is certified that error appears in the above-identified patent and that said Letters Patent is hereby corrected as shown below:

In Fig. 4, Sheet 4 of 9, above the Figure, insert -- 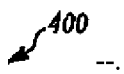 --.

In Column 12, Line 21, in Claim 11, delete "the" and insert -- wherein the --, therefor.

Signed and Sealed this
Eighteenth Day of December, 2012

David J. Kappos
*Director of the United States Patent and Trademark Office*